(12) United States Patent
Kim et al.

(10) Patent No.: US 9,177,704 B2
(45) Date of Patent: Nov. 3, 2015

(54) POTENTIOMETER

(71) Applicants: Yong Dae Kim, Daejeon (KR); Hyun Young Choi, Daejeon (KR)

(72) Inventors: Yong Dae Kim, Daejeon (KR); Hyun Young Choi, Daejeon (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 167 days.

(21) Appl. No.: 13/874,902

(22) Filed: May 1, 2013

(65) Prior Publication Data
US 2013/0314203 A1    Nov. 28, 2013

(30) Foreign Application Priority Data
May 10, 2012    (KR) .................. 10-2012-0049699

(51) Int. Cl.
*H01C 10/30*    (2006.01)
*G01B 7/00*    (2006.01)

(52) U.S. Cl.
CPC ............... *H01C 10/30* (2013.01); *G01B 7/003* (2013.01)

(58) Field of Classification Search
CPC ...... H01C 10/30; H01C 10/303; H01C 10/38; H01C 10/32
USPC ................... 338/160, 162, 176, 177, 165
See application file for complete search history.

(56) References Cited

U.S. PATENT DOCUMENTS

| | | | | |
|---|---|---|---|---|
| 4,345,236 A | * | 8/1982 | Eichelberger et al. | 338/176 |
| 6,507,271 B2 | * | 1/2003 | Taguchi et al. | 338/308 |
| 6,794,984 B2 | * | 9/2004 | Komatsu | 338/202 |
| 7,029,604 B2 | * | 4/2006 | Matsumora et al. | 252/514 |
| 7,049,927 B1 | * | 5/2006 | Hasegawa | 338/160 |
| 2002/0075130 A1 | * | 6/2002 | Taguchi et al. | 338/160 |

* cited by examiner

*Primary Examiner* — Kyung Lee
(74) *Attorney, Agent, or Firm* — Scully, Scott, Murphy & Presser, P.C.

(57) ABSTRACT

The present invention is directed to a potentiometer having enhanced reliability and durability, capable of being unlimitedly used in a high-temperature environment inside a flying object (air vehicle). Said potentiometer comprises: a consecutive type potentiometer having a structure that a resistor is formed of a material having an excellent stability in a high-temperature environment, and having an excellent surface hardness so as to have a high resistance to damages; and a discrete type potentiometer having a structure that a resistor is protected by a passivation layer, and through holes are formed at the passivation layer for electrical connection with the outside, and the through holes are filled with a conductive material.

17 Claims, 19 Drawing Sheets

POTENTIOMETER

CROSS-REFERENCE TO RELATED APPLICATION

Pursuant to 35 U.S.C. §119(a), this application claims the benefit of earlier filing date and right of priority to Korean Application No. 10-2012-0049699, filed on May 10, 2012, the contents of which is incorporated by reference herein in its entirety.

BACKGROUND OF THE INVENTION

1. Field of the Invention

The present disclosure relates to a potentiometer, and particularly, to a potentiometer capable of calculating a position of an external moving body by measuring a resistance change.

2. Background of the Invention

Recently, demand for potentiometers for use in a high-temperature environment which are configured to measure a position of an object to be sensed, increases in the field of aerospace engineering, nuclear power generation, thermal power generation, etc. However, the conventional potentiometer has a limitation in operating at a high temperature, because the maximum operating temperature thereof is about 150° C. In case of measuring a position of an object to be sensed exposed to a high-temperature environment, the object to be sensed can be accurately controlled. Accordingly, the entire system can be accurately operated.

The potentiometer may have a structure that a conductive brush connected to an external moving body moves on a resistor in a direct contacting manner. As the conductive brush moves, a resistance between the end of the resistor and the conductive brush changes. Based on a ratio between the resistance and a reference resistance, a position of an object to be sensed connected to the conductive brush can be measured. However, such potentiometer has the following problems. Firstly, as the resistor is exposed to air, external contaminants may be absorbed to the resistor, or oxidation may occur on the resistor in a high-temperature environment. This may significantly lower reliability at an extreme environment including a high-temperature environment. Further, as the conductive brush directly contacts the resistor, the resistor may be damaged.

SUMMARY OF THE INVENTION

Therefore, an aspect of the detailed description is to provide a potentiometer having enhanced reliability and durability.

Another aspect of the detailed description is to provide a potentiometer capable of being unlimitedly used in a high-temperature environment inside a flying object (air vehicle).

The conventional potentiometer has the following problems. Firstly, as a resistor is exposed to the outside, the potentiometer may chemically react with external impurities or oxidation may occur at a high temperature. This may significantly lower reliability in extreme environments including a high-temperature environment. Further, as a conductive brush directly contacts the resistor, the resistor may be damaged.

To achieve these and other advantages and in accordance with the purpose of this specification, as embodied and broadly described herein, there is provided a potentiometer, comprising: a consecutive type potentiometer having a structure that a resistor is formed of a material having an excellent stability in a high-temperature environment, and having an excellent surface hardness so as to have a high resistance to damages; and a discrete type potentiometer having a structure that a resistor is protected by a passivation layer, and through holes are formed at the passivation layer for electrical connection with the outside, and the through holes are filled with a conductive material.

The consecutive type potentiometer may include a base substrate; a resistor formed on the base substrate, connected to electrodes so as to form a resistance between the electrodes, and formed of a material including a silicide such as $MoSi_2$, $CrSi_2$, $TiSi_2$, $TaSi_2$ and $WSi_2$, or a carbide such as SiC, VC, TiC, TaC and ZrC; and a conductive brush formed to be movable with an object to be sensed and disposed to contact the resistor, so as to generate an electrical signal for calculating a position of the object to be sensed. The silicide and the carbide have characteristics that a melting point is very high, and an oxidation resistance and an electrical/chemical stability are excellent at a high temperature. Especially, due to the high surface hardness, the silicide and the carbide are very resistive to damages by an external element such as a conductive brush.

The discrete type potentiometer may include a base substrate; a resistor formed on the base substrate, and connected to electrodes so as to form a resistance between the electrodes; a passivation layer configured to cover the resistor, and having through holes formed to be spaced from each other along the resistor such that the resistor is partially exposed to the outside at intervals; contact members disposed in the through holes, respectively, and electrically connected to the resistor; and a conductive brush formed to be movable with an object to be sensed and disposed to contact the contact members, so as to generate an electrical signal for calculating a position of the object to be sensed.

According to an embodiment of the discrete type potentiometer, electrode pads for supplying power may be connected to two ends of the resistor, respectively, and the contact members may be linearly arranged between the electrode pads. The contact members may be arranged along first and second lines parallel to each other.

The contact members may be arranged such that the conductive brush contacts another part of the contact members before being disconnected from one part of the contacts members, while moving along the first or second line.

According to another embodiment of the discrete type potentiometer, electrode pads for supplying power may be connected to two ends of the resistor, respectively, and the contact members may be linearly arranged between the electrode pads. The contact members may be formed in a single line, and may be divided into two parts. Such two parts may have an oblique line shape. The conductive brush may have two or more cantilevers contacting the contact members, and may have be configured to contact another part of the contact members before being disconnected from one part of the contacts members while moving.

According to another embodiment of the discrete type potentiometer, the resistor may include vertical portions patterned in a direction perpendicular to a moving direction of the conductive brush, and disposed to be spaced from each other; and horizontal portions formed in a direction crossing the vertical portions, and patterned to serially connect the vertical portions to each other.

The contact members may be arranged to correspond the vertical portions, respectively. The horizontal portions may be alternately connected to one ends and another ends of the vertical portions such that a plurality of rows are formed. The contact members may be alternately arranged at one ends and another ends of the vertical portions along the moving direction, so as to be arranged in the multi rows.

The contact members may be formed such that the length thereof in a direction of the vertical portions is greater than the width thereof in a direction of the horizontal portions.

According to another embodiment of the discrete type potentiometer, the contact members may be filled in the through holes so as to be exposed to the outside in a laminated state on the resistor. An insulating layer may be formed between the base substrate and the resistor, and the passivation layer may be formed to cover the insulating layer as well as the resistor. For an enhanced spatial resolution, each of the resistor, the passivation layer, the through holes and the contact members may be formed by a micro patterning using Micro Electro Mechanical Systems (MEMS) and Nano Electro Mechanical Systems (NEMS). The resistor may be formed by an impurity doping method.

To achieve these and other advantages and in accordance with the purpose of this specification, as embodied and broadly described herein, there is also provided a flying object, comprising: a body having an actuator; and a potentiometer connected to a moving member which moves with interworking with the actuator.

The potentiometer of the present invention may have the following advantages.

In the consecutive type potentiometer, the resistor may be formed of a material having an excellent surface hardness, and having an excellent stability in a high-temperature environment. This may protect the resistor from contamination, oxidation and damage in extreme environments including a high-temperature environment.

In the discrete type potentiometer, the resistor can be protected from contamination, oxidation and damage in extreme environments including a high-temperature environment, using the passivation layer, the through holes and the contact members.

Under such configurations, the potentiometer can have enhanced reliability and durability, and can be used in extreme environments including a high-temperature environment or a low-temperature environment.

Further, the resistor and the contact members can have micro patterns fabricated in an integrated manner through MEMS/NEMS. This can improve a spatial resolution, enhance yield, and lower the fabrication cost.

In the discrete type potentiometer, the conductive brush contacts a plurality of regions of the contact members arranged in multi rows. This can allow a signal to noise to be removed at a section where a resistance or a voltage changes.

In the discrete type potentiometer, the contact members may have an oblique line shape. Accordingly, even if the contact members are formed in a single row, discrete type signals having a consecutive stair shape can be output without an open region of a resistance or a voltage while the conductive brush moves.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a potentiometer according to the present invention will be explained in more detail with reference to the attached drawings. The suffixes attached to components of the wireless speaker, such as 'module' and 'unit or portion' were used for facilitation of the detailed description of the present disclosure. Therefore, the suffixes do not have different meanings from each other. For the sake of brief description with reference to the drawings, the same or equivalent components will be provided with the same reference numbers, and description thereof will not be repeated. A singular expression includes a plural concept unless there is a contextually distinctive difference therebetween.

The potentiometer of the present invention is mounted to a flying object such as a guided weapon or an aircraft, and is configured to precisely control various types of actuators provided at a body of the flying object.

Figure 1:
FIG. 1 is a planar view of a consecutive type potentiometer according to an embodiment of the present invention.
Figure 2:
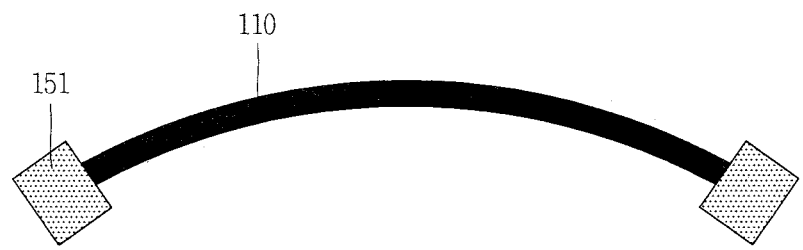
FIG. 2 is a planar view of a consecutive type potentiometer of FIG. 1 according to an embodiment of the present invention.

FIG. 1 is a planar view of a consecutive type potentiometer according to an embodiment of the present invention, and FIG. 2 is a planar view of a consecutive type potentiometer of FIG. 1 according to an embodiment of the present invention.

Referring to FIGS. 1 and 2, the consecutive type potentiometer according to an embodiment of the present invention includes a resistor 110 configured to connect electrodes 151 and 152 to each other. The resistor 110 is formed of a material including a silicide such as $MoSi_2$, $CrSi_2$, $TiSi_2$, $TaSi_2$ and $WSi_2$, or a carbide such as SiC, VC, TiC, TaC and ZrC. The silicide and the carbide have characteristics that a melting point is very high, and an oxidation resistance and an electrical/chemical stability are excellent at a high temperature. Especially, due to the high surface hardness, the silicide and the carbide are very resistive to damages by an external element such as a conductive brush.

Figure 3A:
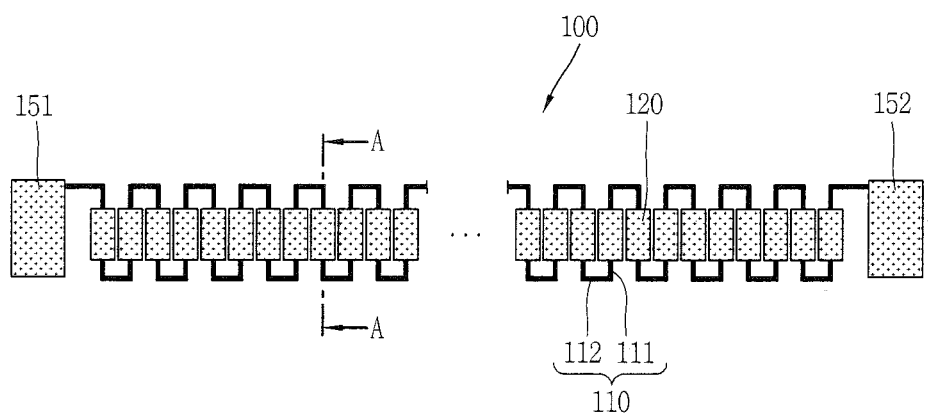
FIG. 3A is a planar view of a discrete type potentiometer according to an embodiment of the present invention.
Figure 3B:
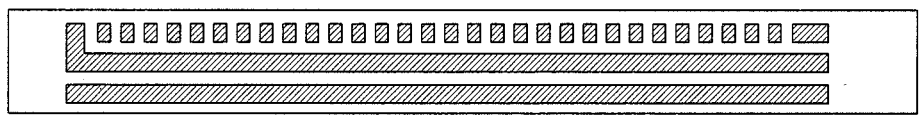
FIG. 3B is a photo showing a fabricated state of a discrete type potentiometer according to an embodiment of the present invention.
Figure 4:
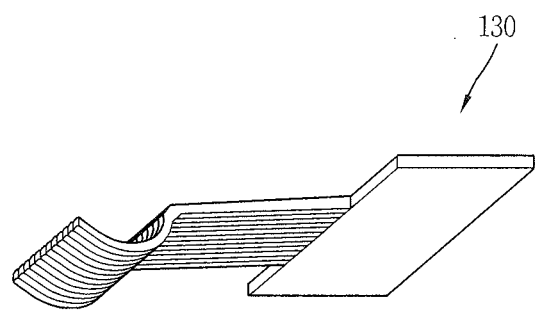
FIG. 4 is a perspective view of a conductive brush of FIG. 3A.

FIG. 3A is a planar view of a discrete type potentiometer according to an embodiment of the present invention. FIG. 3B is a photo showing a fabricated state of a discrete type potentiometer according to an embodiment of the present invention. FIG. 4 is a perspective view of a conductive brush of FIG. 3A.

Referring to FIGS. 3A to 4, the discrete type potentiometer 100 according to an embodiment of the present invention includes a resistor 110 configured to connect electrodes (not shown) to each other, and contact members 120 disposed to be spaced from each other by a prescribed interval along the resistor 110. As a conductive brush 130 moves in the alignment direction of the contact members 120, a resistance or a voltage between the conductive brush 130 and the electrodes changes. The conductive brush 130 is formed to be movable with an object to be sensed and is disposed to contact the contact members 120, so as to generate an electrical signal for calculating a position of the object to be sensed.

As the conductive brush 130 moves on the resistor 110, a resistance is variable. Based on a ratio between such resistance and a reference resistance, can be measured a position of an external moving body connected to the conductive brush 130. For instance, as the conductive brush 130 is connected to a moving member (not shown) which interworks with an actuator provided at a flying object, a position of the moving member can be measured.

Figure 5A:
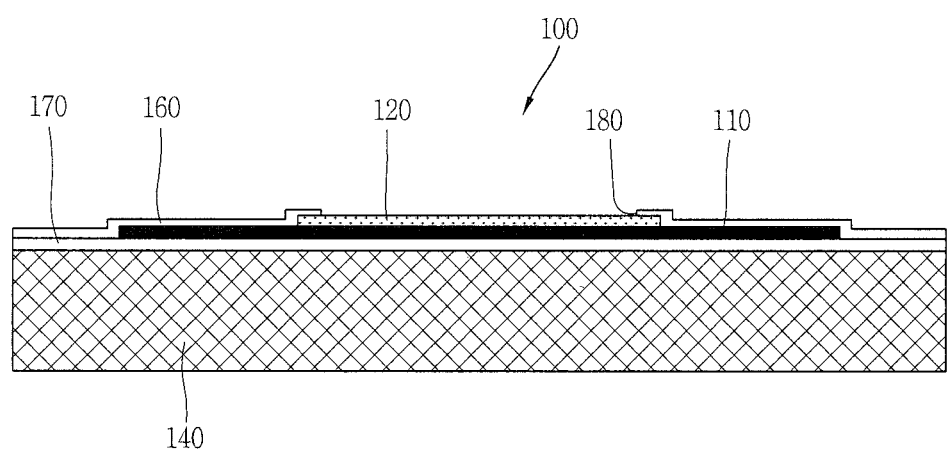
FIG. 5A is a sectional view taken along line 'A-A' in FIG. 3A.
Figure 5B:
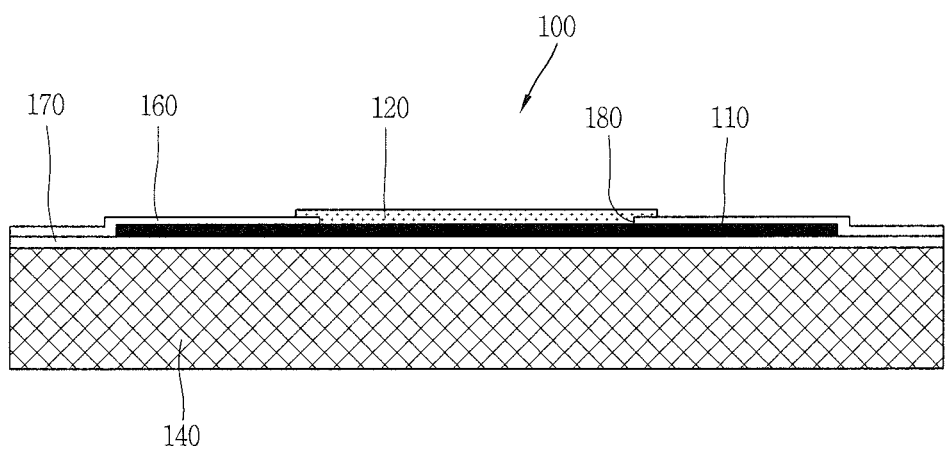
FIGS. 5B and 5C are views taken along line 'A-A' in FIG. 3A, which show a potentiometer according to a modification embodiment.
Figure 5C:
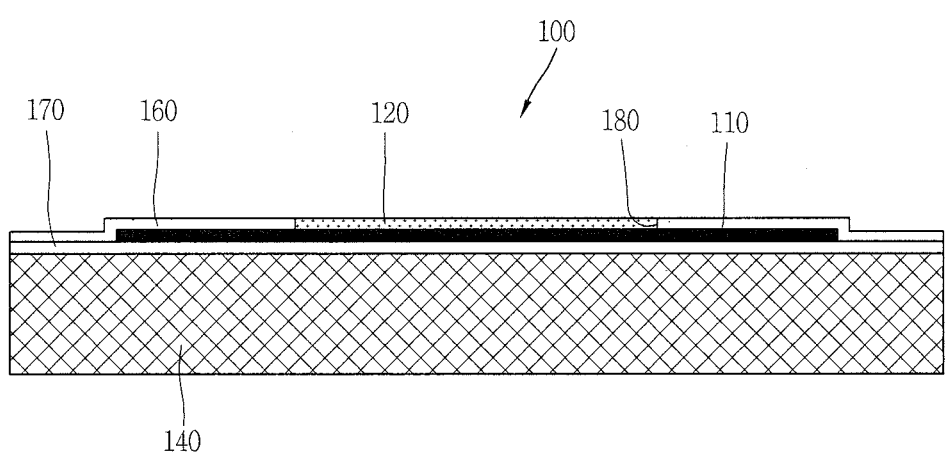
Figure 6:
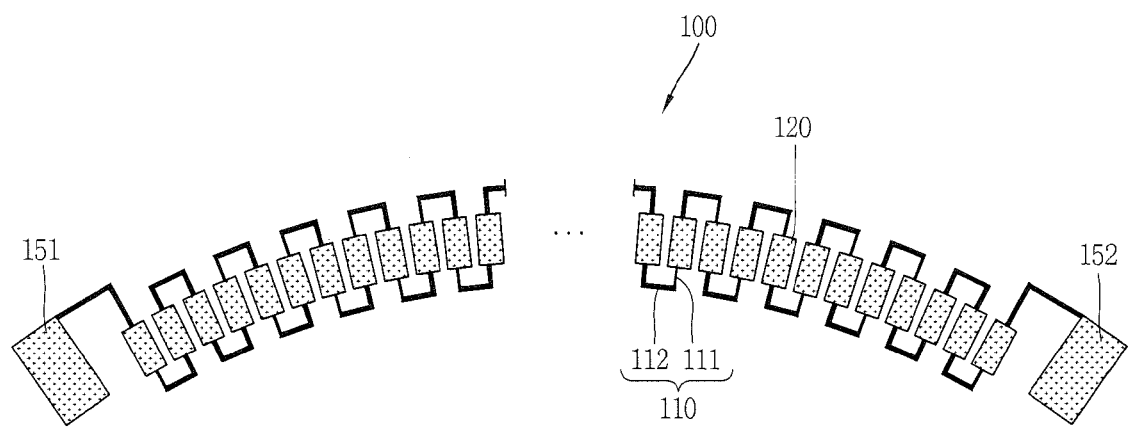
FIG. 6 is a planar view showing a potentiometer of FIG. 3A according to another modification embodiment.

FIG. 5A is a sectional view taken along line 'A-A' in FIG. 3A. FIGS. 5B and 5C are views taken along line 'A-A' in FIG. 3A, which show a potentiometer according to a modification embodiment. FIG. 6 is a planar view showing a potentiometer of FIG. 3A according to another modification embodiment.

Referring to FIG. 5A, a structure of the potentiometer 100 will be explained in more detail.

A resistor 110 is connected to electrodes on a base substrate 140 so as to form a resistance between the electrodes. For instance, electrode pads 151 and 152 for supplying power are connected to two ends of the resistor 110, respectively. The resistor may be formed of a single material, or a mixture material, or an alloy, etc.

A passivation layer 160 for covering the resistor 110 is formed on the base substrate 140. The passivation layer 160 serves as an oxidation preventing layer for preventing oxidation of the resistor 110, and may be formed of an insulating material. For instance, the passivation layer 160 may be formed of $SiO_2$, $Si_xN_y$, DLC (Diamond-like-Carbon), ceramic, etc.

An insulating layer 170 is formed between the base substrate 140 and the resistor 110, and the passivation layer 160 may be formed to cover the insulating layer 170 as well as the resistor 110.

For electrical connection between the resistor 110 and the conductive brush 130, through holes 180 are formed at the passivation layer 160. Then, the through holes 180 are filled with a material having a specific resistivity lower than that of the resistor. As a result, the contact members 120 are formed. The contact members 120 may be formed of a conductive material, and may have a structure that a resistance thereof is much lower than that of a unitary resistor. The contact members may be formed of a material having a low specific resistivity, and having a low oxidation speed at a high temperature or having a chemical stability. For instance, the contact members 120 may be formed of a platinum alloy, a tungsten alloy, grapheme, etc., and may be configured as contact pads.

For an enhanced spatial resolution, each of the resistor 110, the passivation layer 160, the through holes 180 and the contact members 120 may be formed by a micro patterning using Micro Electro Mechanical Systems (MEMS) and Nano Electro Mechanical Systems (NEMS). Through such micro pattern, the resistor 110 and the contact members 120 may be formed to have a precise size. In this case, the resistor 110 may be formed by an impurity doping method. Such impurity doping method is generally used in semiconductor processes and MEMS/NEMS processes. The impurity doping method may be a process for doping impurities so as to control an electrical property of a device. Generally, the impurity doping method may be a process for controlling a physical property such as a specific resistivity, a thermal expansion coefficient, a temperature coefficient of resistivity (TCR), by doping a material such as boron and phosphorus in a semiconductor material such as silicone.

More specifically, the through holes 180 are formed to be spaced from each other along the resistor 110 so that the resistor 110 can be partially exposed to the outside at intervals. The contact members are filled in the through holes so as to be exposed to the outside in a laminated state on the resistor. Under such configuration, the contact members 120 are disposed in the through holes 180, respectively, and are electrically connected to the resistor 110.

The sectional structure of the potentiometer 100 may be transformed into various forms as shown in FIGS. 5B and 5C. Referring to FIG. 5B, the contact members 120 may be configured to protrude more than the passivation layer 160. Referring to FIG. 5C, the contact members 120 and the passivation layer 160 may have the same height. In this case, the external surface of the contact members 120 and the external surface of the passivation layer 160 may be formed on the same plane.

Referring to FIG. 3 back, the resistor 110 includes vertical portions 111 and horizontal portions 112.

The vertical portions 111 are patterned in a direction perpendicular to a moving direction of the conductive brush, and are spaced from each other in groups. The horizontal portions 112 are formed in a direction crossing the vertical portions 111, and are patterned in groups for serially connecting the vertical portions 111 to each other. That is, the horizontal portions 112 are alternately connected to one ends and another ends of the vertical portions 111 so that a plurality of rows can be formed. Under such configuration, the resistor 110 has a pattern like a pulse waveform, and the potentiometer has a structure where the resistor and the contact members are sequentially arranged.

The contact members 120 are linearly arranged between the electrode pads 151 and 152. For instance, as shown in FIG. 3, the contact members 120 may be arranged along a straight line. However, the present invention is not limited to this. As shown in FIG. 6, the contact members 120 may be arranged along a curved line.

More specifically, the contact members 120 may be arranged to correspond to the vertical portions 111, respectively. In order to lower a specific resistivity, the contact members 120 may be formed so that the length thereof in a direction of the vertical portions 111 can be greater than the width thereof in a direction of the horizontal portions 112.

Under such configuration, a resistance or a voltage between the electrode pads 151 and 152 and the contact members 120, changes in the form of stairs according to a contact position of the conductive brush 130. Accordingly, may be implemented a potentiometer capable of sensing a position of the conductive brush 130 while preventing damage and oxidation of the resistor 110.

Figure 7:
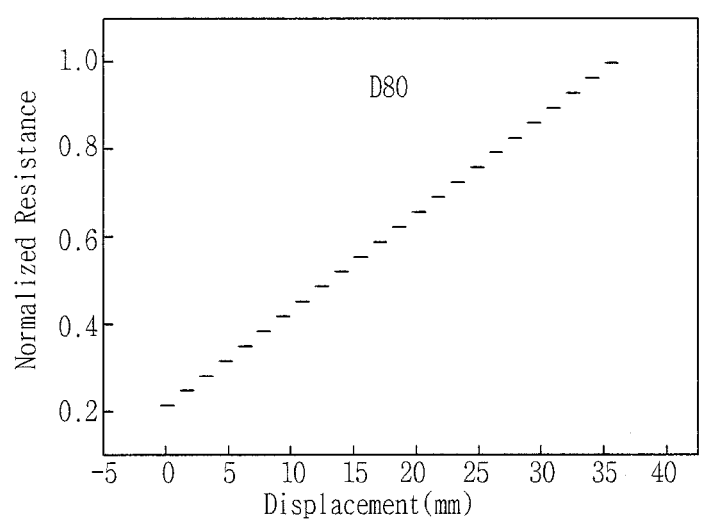
FIG. 7 is a graph showing a normalized resistance between an electrode pad and a conductive brush according to a displacement of the conductive brush, in the fabricated potentiometer of FIG. 3B.
Figure 8:
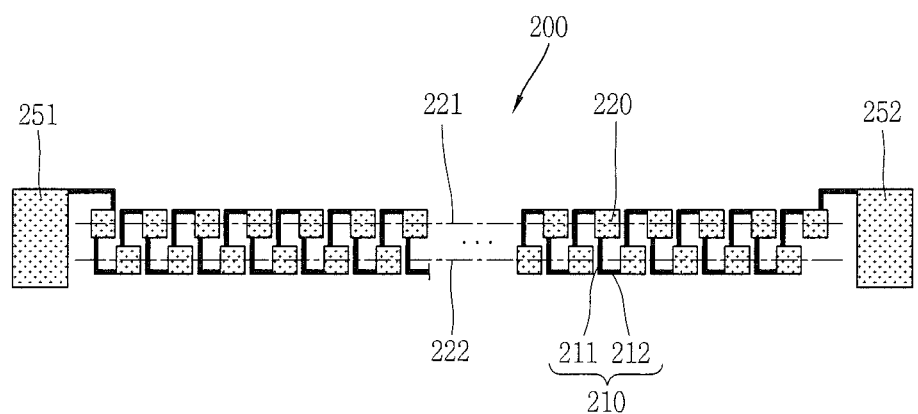
FIG. 8 is a planar view of a discrete type potentiometer according to another embodiment of the present invention.

The present invention proposes a method for enhancing sensing efficiency of the potentiometer. FIG. 7 is a graph showing a normalized resistance between an electrode pad and a conductive brush according to a displacement of the conductive brush, and FIG. 8 is a planar view of a potentiometer according to another embodiment of the present invention.

Referring to FIG. 3A, a region between the contact members of the potentiometer is electrically open. Accordingly, when the conductive brush passes through the open region between the contact members, the resistance unlimitedly increases as shown in FIG. 7. In order to restrict the unlimited increase of the resistance, as shown in FIG. 8, the contact members 220 may be arranged along first and second lines 221 and 222 parallel to each other. In this case, the conductive brush may be formed to have a size contactable to all the contact members of the first and second lines 221 and 222. However, the present invention is not limited to this. For instance, the contact members 220 may be arranged in multi rows (e.g., three rows or more than).

More specifically, a resistor 210 and the contact members 220 may be arranged to cross each other. For instance, the contact members 220 are alternately arranged at one ends and another ends of the vertical portions 211 along the moving direction, so as to be arranged in the respective rows of the horizontal portions 212.

In the potentiometer, the contact members may partially overlap each other in a width direction.

Hereinafter, a modification embodiment of the potentiometer will be explained in more detail.

Figure 9A:
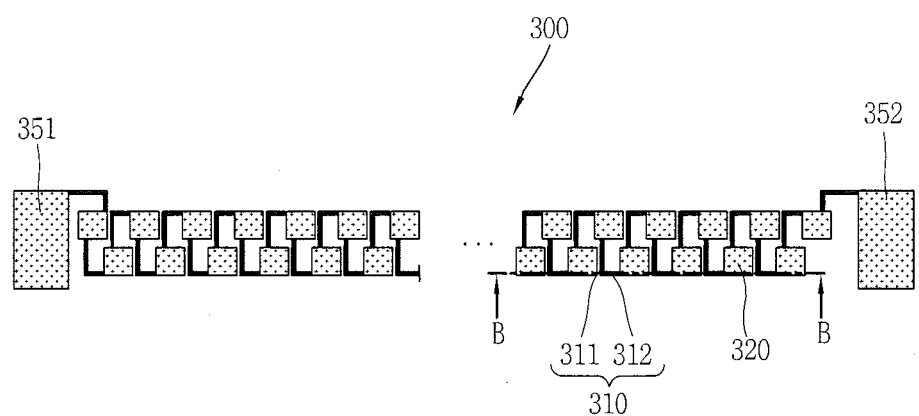
FIG. 9A is a planar view of a potentiometer of FIG. 8 according to a modification embodiment.
Figure 9B:
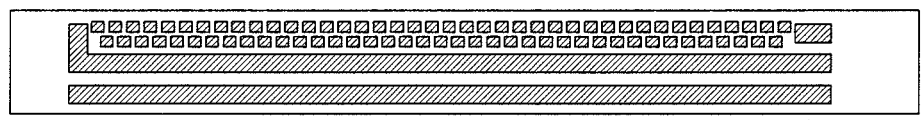
FIG. 9B is a photo showing a fabricated state of the potentiometer of FIG. 9A.
Figure 10:
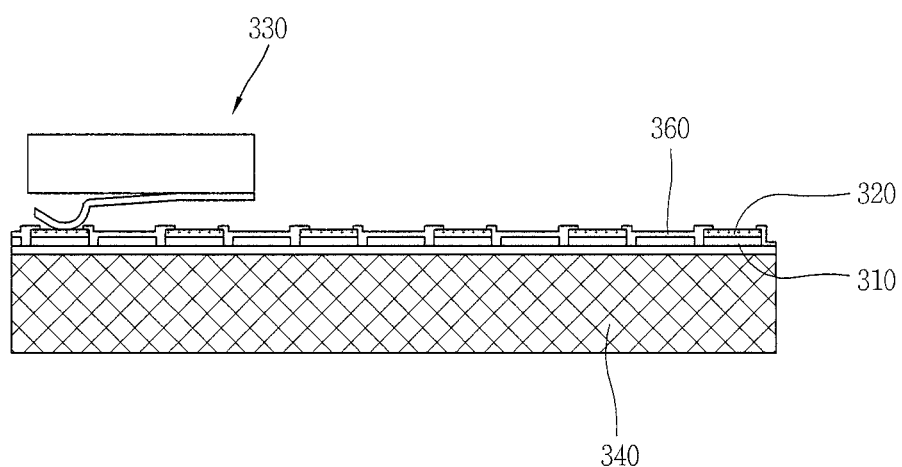
FIG. 10 is a sectional view taken along line 'B-B' in FIG. 9A.
Figure 11A:
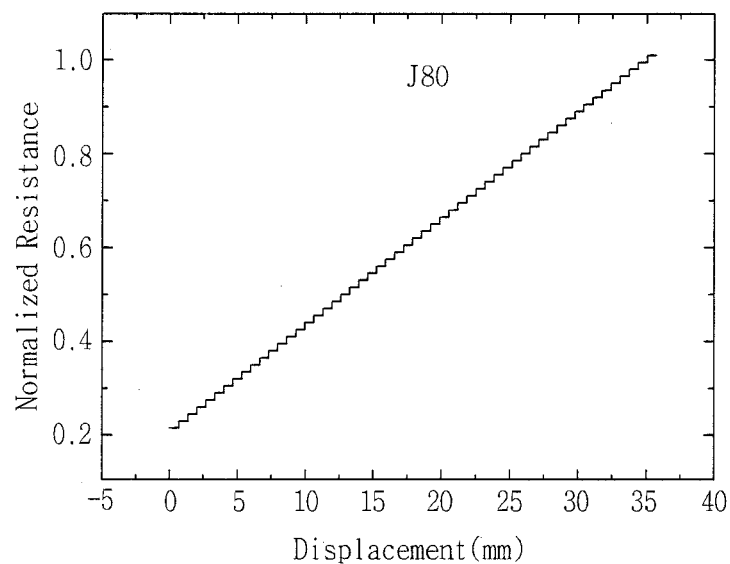
FIG. 11A is a graph showing a normalized resistance between an electrode pad and a conductive brush according to a displacement of the conductive brush, in the fabricated potentiometer of FIG. 9B.
Figure 11B:
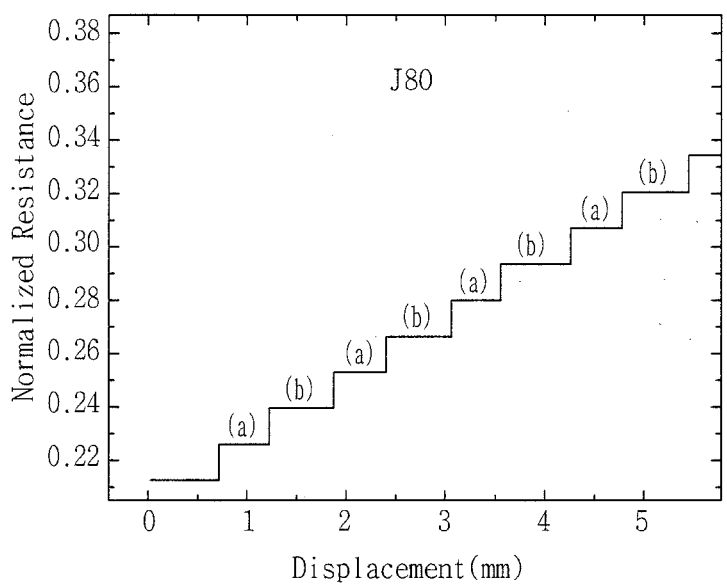
FIG. 11B is an enlarged graph of the graph of FIG. 11A.

FIG. 9A is a planar view of a potentiometer of FIG. 8 according to a modification embodiment. FIG. 9B is a photo showing a fabricated state of the potentiometer of FIG. 9A. FIG. 10 is a sectional view taken along line 'B-B' in FIG. 9A. FIG. 11A is a graph showing a normalized resistance between an electrode pad and a conductive brush according to a displacement of the conductive brush, in the fabricated potentiometer of FIG. 9B. FIG. 11B is an enlarged graph of the graph of FIG. 11A.

Referring to FIGS. 9A and 9B, contact members 320 are linearly arranged between electrode pads 351 and 352. A conductive brush 330 (refer to FIG. 10) linearly moves. Such configuration is the same or similar as/to that of the aforementioned embodiment. The contact members 320 are arranged so that the conductive brush 330 can contact another part of the contact members 320 before being disconnected from one part of the contacts members 320 while linearly moving.

That is, the contact members 320 overlap each other at least partially, in a direction perpendicular to a connection direction between the electrode pads 351 and 352. The conductive brush 330 is formed to contact all the overlapped parts. Under such configuration, as the conductive brush moves, a resistance or a voltage of the potentiometer changes in the form of consecutive stairs shown in FIG. 9A.

As shown in FIG. 11B, the potentiometer according to one embodiment has a problem that the lengths of spatial resolutions (region 'a' and 'b' in FIG. 11B) are different. Such problem results from that contact types between each part of the conductive brush and the potentiometer are not uniform.

Figure 12:
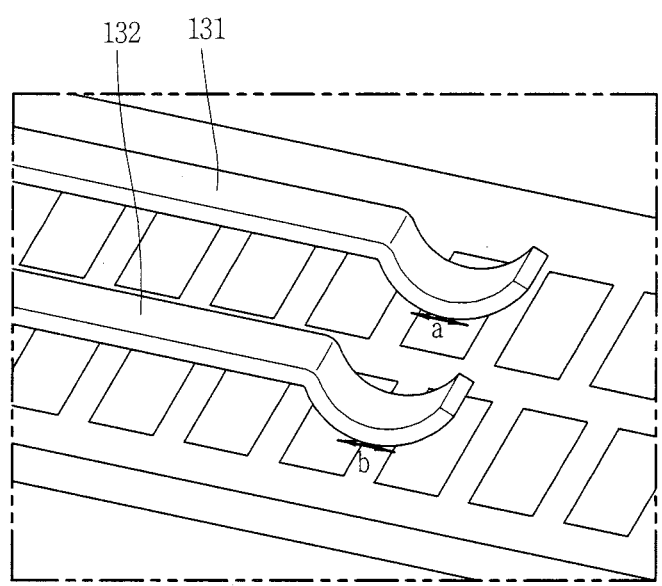
FIG. 12 is a photo showing a contact state between a conductive brush and a potentiometer.
Figure 13:
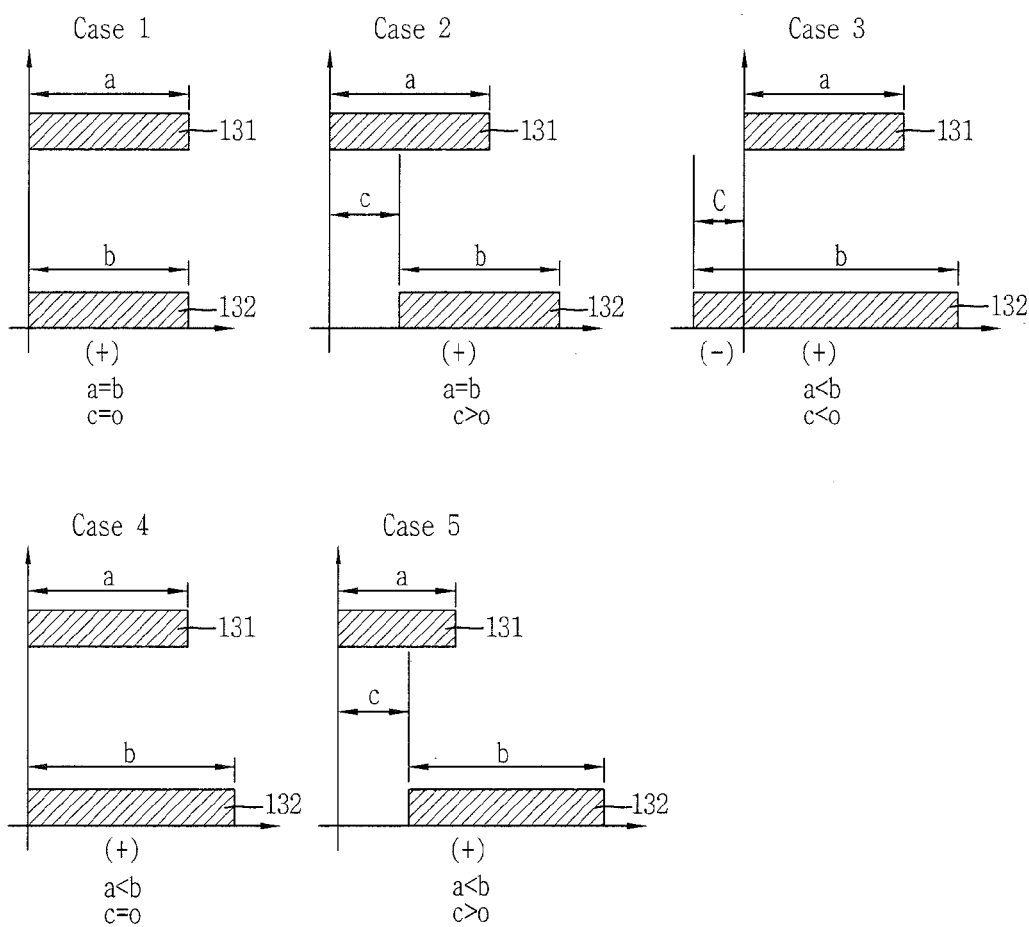
FIG. 13 is a view showing various contact types between a conductive brush and a potentiometer.
Figure 14A:
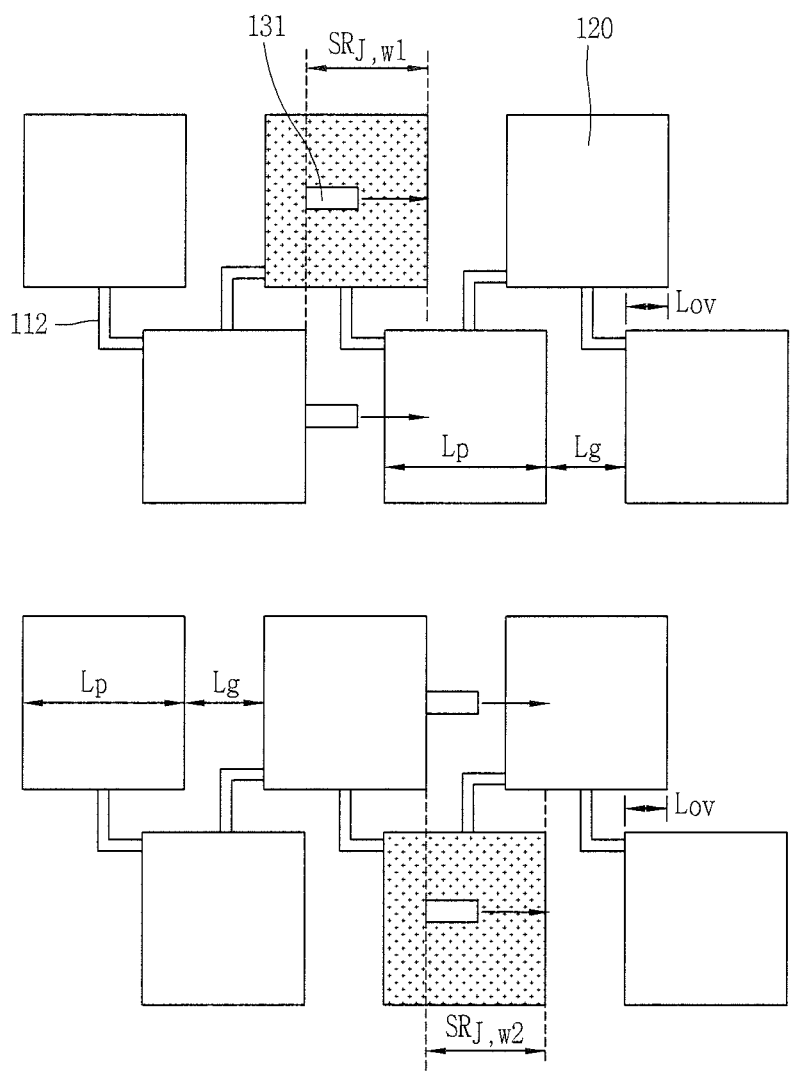
FIG. 14A is a perspective view showing a spatial resolution at each part of a conductive brush when a contact type between the conductive brush and a potentiometer corresponds to case 1 of FIG. 13.
Figure 14B:
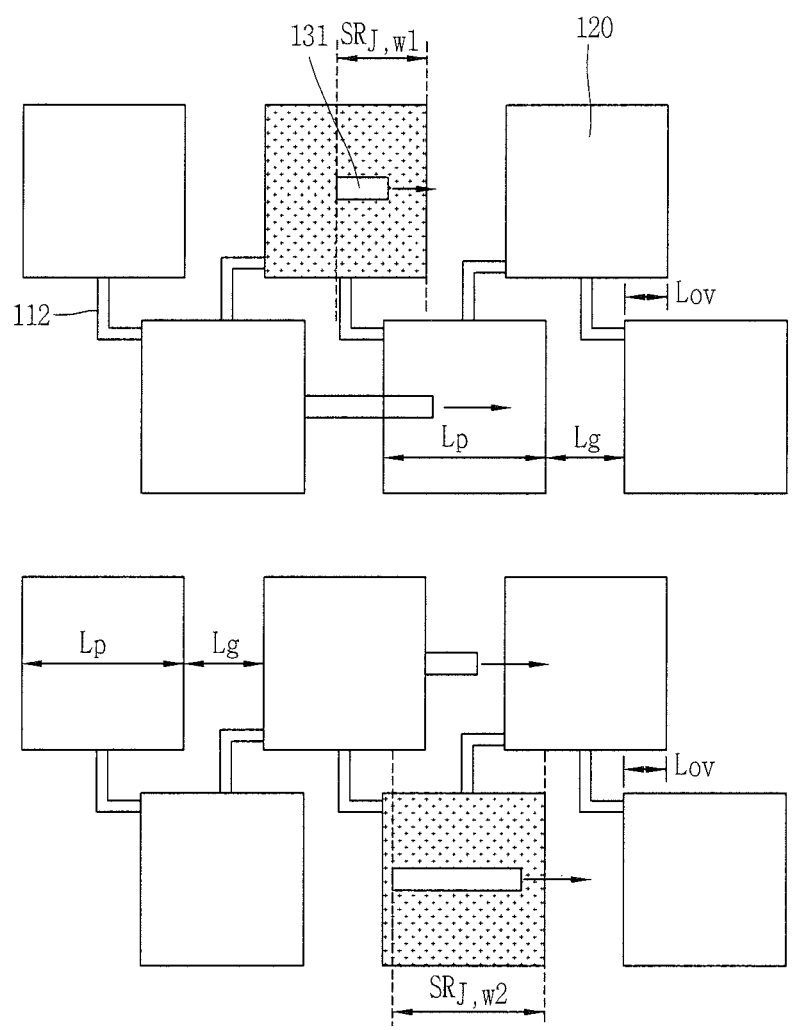
FIG. 14B is a perspective view showing a spatial resolution at each part of a conductive brush when a contact type between the conductive brush and a potentiometer corresponds to case 3 of FIG. 13.
Figure 14C:
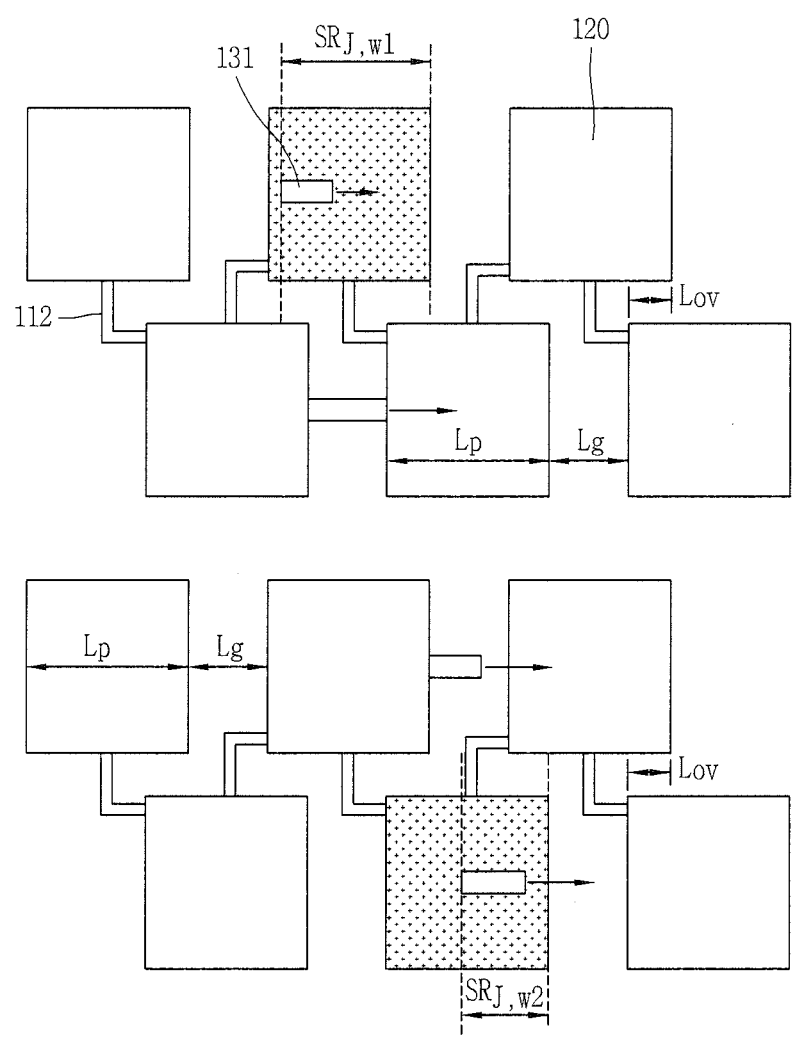
FIG. 14C is a perspective view showing a spatial resolution at each part of a conductive brush when a contact type between the conductive brush and a potentiometer corresponds to case 5 of FIG. 13.

FIG. 12 is a photo showing a contact state between a conductive brush and a potentiometer. Referring to FIG. 12, the lengths ('a' and 'b') of contact parts between the conductive brush and the potentiometer may change according to fabrication conditions, treatment conditions, etc. of the conductive brush. FIG. 13 is a view showing various contact types between a conductive brush and a potentiometer. According to a shape of the conductive brush, various spatial resolutions are implemented as shown in FIG. 14. In FIG. 14, $SR_{J,w1}$ and $SR_{J,w2}$ indicate spatial resolutions according to movement of each part of the conductive brush. Each spatial resolution can be calculated using FIGS. 13 and 14 as follows.

$$SR_{J,w1} = (L_p - L_{ov}) + c$$

$$SR_{J,w2} = (L_p - L_{ov}) - c$$

As can be seen from the above equations, the spatial resolutions are different from each other according to a shape of the conductive brush. As the conductive brush moves, non-uniform stair-shaped signals are output as shown in FIG. 11.

If the spatial resolutions are not uniform as the conductive brush moves, the potentiometer cannot be used as a precise potentiometer. In order to solve such problem, the conductive brush should be fabricated very precisely. However, in this case, yield of the conductive brush may be lowered. Further, in a case where the conductive brush has a little damage while moving or during assembly processes, the form of the conductive brush may change. This may cause a precise potentiometer not to be fabricated.

In order to solve such problems, the present invention proposes an oblique line-shaped potentiometer of FIG. 15.

Figure 15A:
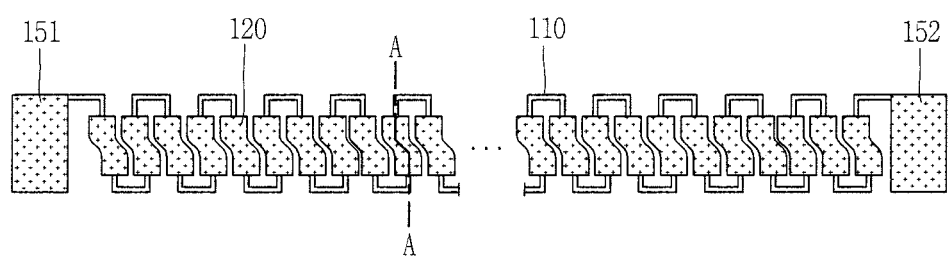
FIG. 15A is a planar view of a potentiometer according to still another modification embodiment (oblique line-shaped potentiometer)
Figure 15B:
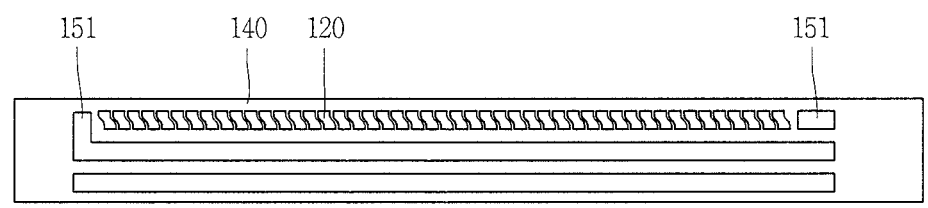
FIG. 15B is a photo showing a fabricated state of the oblique line-shaped potentiometer of FIG. 15A.
Figure 15C:
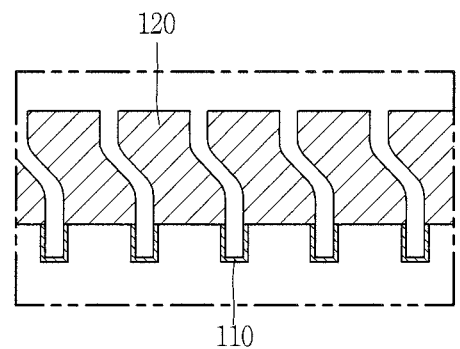
FIG. 15C is an enlarged photo of the oblique line-shaped potentiometer of FIG. 15B
Figure 16:
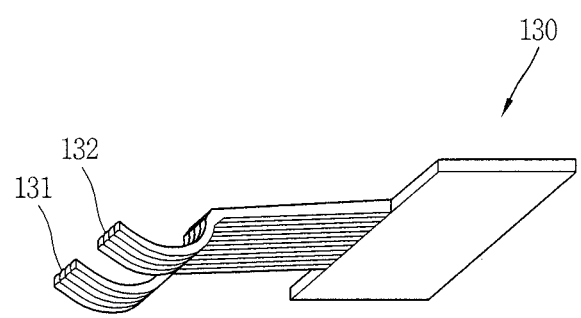
FIG. 16 is a perspective view of a conductive brush of FIG. 15A.
Figure 17:
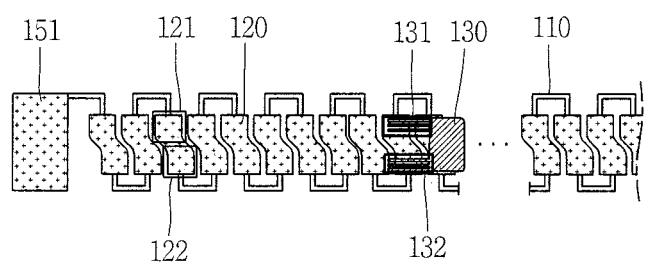
FIG. 17 is a perspective view showing a contact state between a conductive brush and an oblique line-shaped potentiometer of FIG. 15.
Figure 18A:
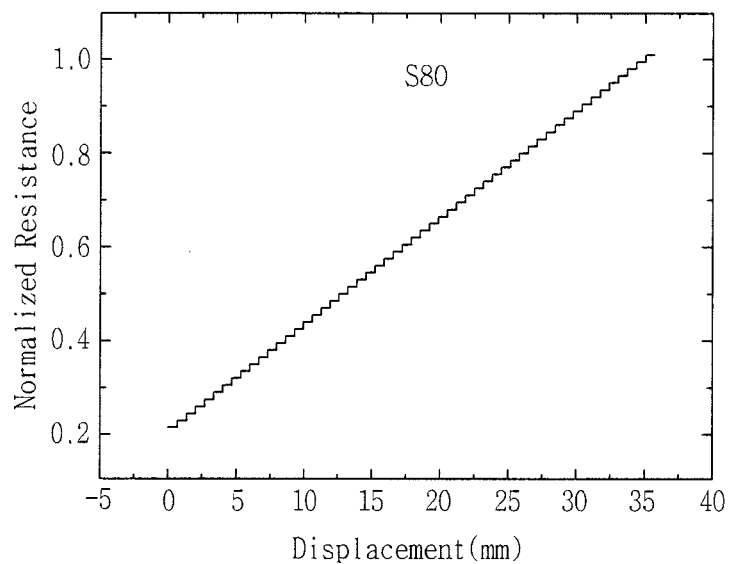
FIG. 18A is a graph showing a normalized resistance between an electrode pad and a conductive brush according to a displacement of the conductive brush, in the fabricated oblique line-shaped potentiometer of FIG. 15B.
Figure 18B:
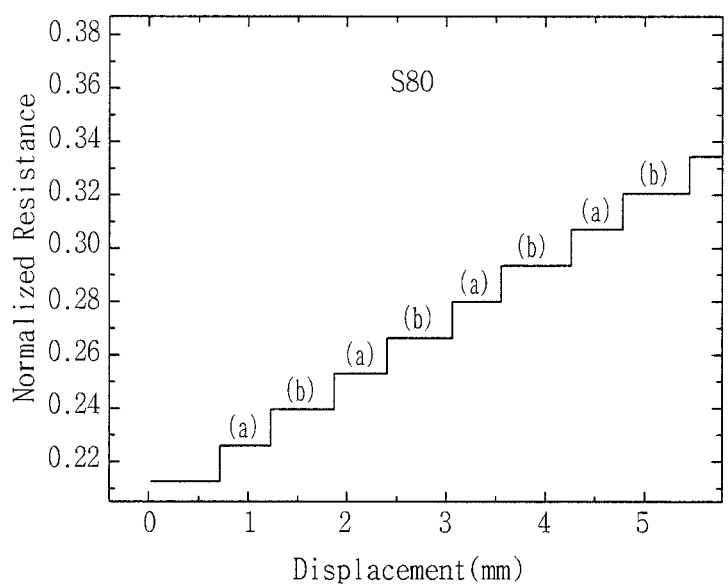
FIG. 18B is an enlarged graph of the graph of FIG. 18A.

FIG. 15A is a planar view of an oblique line-shaped potentiometer. FIG. 15B is a photo showing a fabricated state of the oblique line-shaped potentiometer of FIG. 15A. FIG. 15C is an enlarged photo of the oblique line-shaped potentiometer of FIG. 15B. FIG. 16 is a perspective view of a conductive brush of FIG. 15A. FIG. 17 is a perspective view showing a contact state between a conductive brush and an oblique line-shaped potentiometer of FIG. 15. FIG. 18A is a graph showing a normalized resistance between an electrode pad and a conductive brush according to a displacement of the conductive brush, in the oblique line-shaped potentiometer of FIG. 15B. FIG. 18B is an enlarged graph of the graph of FIG. 18A.

Referring to FIGS. 15A to 16, contact members 120 are linearly arranged, and a resistor 110 is connected to the contact members 120 between the contact members 120. Referring to FIG. 15A, the line 'A-A' connecting the center of the contact member has an upper straight line, a central oblique line and a lower straight line. The upper straight line and the lower straight line extend in parallel to each other, and the central oblique line is formed to connect the upper and lower straight lines to each other.

More specifically, the contact member 120 having a thin plate shape has a bent central part, so that the upper part thereof has a "⌊" shape and the lower part thereof has a "⌉" shape. Under such configuration, when the upper part of the first contact member contacts the conductive brush, the lower part of the second contact member adjacent to the first contact member may contact the conductive brush.

Each of the resistor 110 and the contact members 120 should have a very precise shape. Therefore, in this embodiment, the resistor and the contact members were patterned in a lamination and etching manner using Micro Electro Mechanical Systems (MEMS) and Nano Electro Mechanical Systems (NEMS).

The structure of the potentiometer 100 will be explained in more detail with reference to FIG. 17.

The contact member 120 is divided into two parts 121 and 122, and the two parts 121 and 122 have an oblique line shape. As the conductive brush 130 moves, one part 131 or 132 of the conductive brush 130 firstly contacts one part 121 or 122 of the contact member. Then, before said one part of the conductive brush is disconnected from said one part of the contact members, another part 132 or 131 of the conductive brush contacts another part 122 or 121 of the contact member. Accordingly, when the conductive brush 130 moves along the contact members 120, a resistance of the potentiometer changes in a stair shape while contact parts between the contact members and the conductive brush are consecutive without any open region, as shown in FIG. 18A.

As shown in FIG. 18B, as the conductive brush moves, contact parts between the conductive brush and the contact members have the same spatial resolution (regions 'a' and 'b' in FIG. 18B) regardless of a shape of the conductive brush.

Figure 19A:
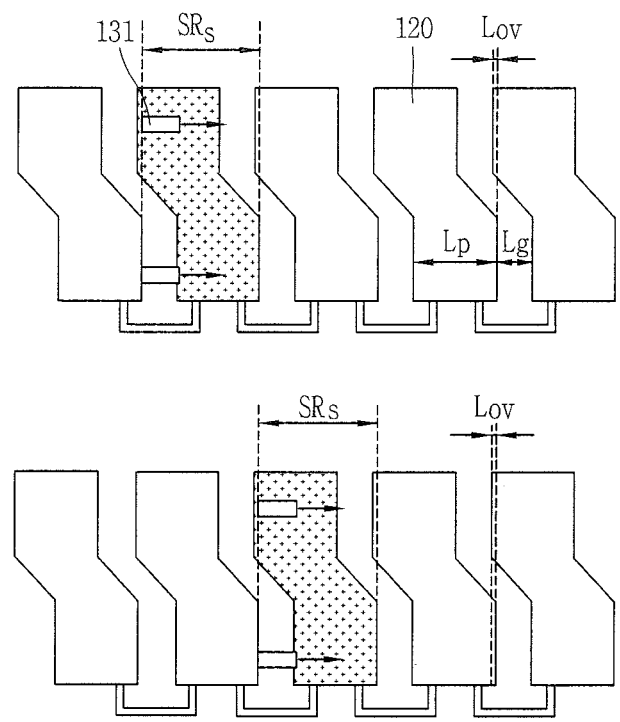
FIG. 19A is a perspective view showing a spatial resolution at each part of a conductive brush when a contact type between the conductive brush and an oblique line-shaped potentiometer corresponds to case 1 of FIG. 13.
Figure 19B:
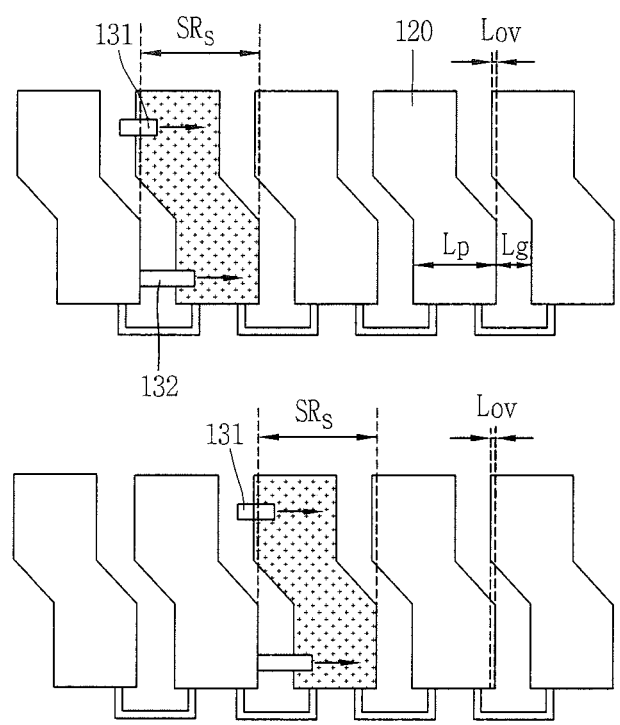
FIG. 19B is a perspective view showing a spatial resolution at each part of a conductive brush when a contact type between the conductive brush and an oblique line-shaped potentiometer corresponds to case 5 of FIG. 13.

FIG. 19 is a perspective view showing a spatial resolution at each part of a conductive brush according to movement of the conductive brush. The spatial resolution can be calculated using FIG. 19 as follows.

$$SR_s = L_p + L_g$$

In case of a potentiometer having oblique line-shaped contact pads of FIG. 15, the same spatial resolution ($SR_s$) is implemented regardless of a shape of the conductive brush.

The oblique line-shaped potentiometer according to this embodiment can overcome all the problems of a potentiometer according to another embodiment. That is, in this embodiment, a potentiometer can be manufactured to have the same spatial resolution and to have a structure where no open region of a resistance or a voltage occurs while a conductive brush moves.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A potentiometer, comprising:
   a base substrate;
   a resistor formed on the base substrate, and connected to electrodes so as to form a resistance;
   a passivation layer configured to cover at least part of the resistor, and having through holes formed to be spaced from each other along the resistor such that the resistor is partially exposed to the outside at intervals;
   contact members disposed in the through holes, respectively, and electrically connected to the resistor; and
   a conductive brush formed to be movable with an object to be sensed and disposed to contact the contact members, so as to generate an electrical signal for calculating a position of the object to be sensed.

2. The potentiometer of claim 1, wherein electrode pads for supplying power are connected to two ends of the resistor, respectively, and
   wherein the contact members are arranged along a line which connects the electrode pads to each other.

3. The potentiometer of claim 2, wherein the contact members are arranged along first and second lines parallel to each other.

4. The potentiometer of claim 3, wherein the contact members are arranged such that the conductive brush contacts another part of the contact members before being disconnected from one part of the contacts members while moving along the line which connects the electrode pads to each other.

5. The potentiometer of claim 3, wherein the conductive brush is divided into two parts, and wherein the conductive brush is arranged so as to contact another part of the contact members before being disconnected from one part of the contacts members while moving along the line which connects the contact members to each other.

6. The potentiometer of claim 2, wherein the contact members are divided into two parts, and
wherein at least part of the two parts has an oblique line shape such that the two parts are connected to each other.

7. The potentiometer of claim 1, wherein the resistor includes:
vertical portions patterned in a direction perpendicular to a moving direction of the conductive brush, and disposed to be spaced from each other; and
horizontal portions formed in a direction crossing the vertical portions, and patterned to serially connect the vertical portions to each other.

8. The potentiometer of claim 7, wherein the contact members are arranged to correspond the vertical portions, respectively.

9. The potentiometer of claim 8, wherein the horizontal portions are alternately connected to one ends and another ends of the vertical portions such that a plurality of rows are formed, and
wherein the contact members are alternately arranged at one ends and another ends of the vertical portions along the moving direction, so as to be arranged in the multi rows.

10. The potentiometer of claim 7, wherein the contact members are formed such that the length thereof in a direction of the vertical portions is greater than the width thereof in a direction of the horizontal portions.

11. The potentiometer of claim 1, wherein the contact members are filled in the through holes so as to be exposed to the outside in a laminated state on the resistor.

12. The potentiometer of claim 1, wherein an insulating layer is formed between the base substrate and the resistor, and
wherein the passivation layer is formed to cover the insulating layer as well as the resistor.

13. The potentiometer of claim 1, wherein for an enhanced spatial resolution, each of the resistor, the passivation layer, the through holes and the contact members is formed by a micro patterning using Micro Electro Mechanical Systems (MEMS) and Nano Electro Mechanical Systems (NEMS).

14. The potentiometer of claim 1, wherein the resistor is formed by an impurity doping method.

15. A flying object, comprising:
a body having an actuator; and
a potentiometer connected to a moving member which moves with interworking with the actuator,
wherein the potentiometer comprises:
a base substrate;
a resistor formed on the base substrate, and connected to electrodes so as to form a resistance between the electrodes;
a passivation layer configured to cover the resistor, and having through holes formed to be spaced from each other along the resistor such that the resistor is partially exposed to the outside at intervals;
contact members disposed in the through holes, respectively, and electrically connected to the resistor; and
a conductive brush formed to be movable with an object to be sensed and disposed to contact the contact members, so as to generate an electrical signal for calculating a position of the object to be sensed.

16. The flying object of claim 15, wherein electrode pads for supplying power are connected to two ends of the resistor, respectively, and
wherein the contact members are linearly arranged between the electrode pads.

17. The flying object of claim 15, wherein the contact members are arranged so that the conductive brush contacts another part of the contact members before being disconnected from one part of the contacts members while linearly moving.

* * * * *